Aug. 30, 1966  J. S. CASE  3,268,946

GATE HINGE SUPPORT CLAMP DEVICE

Filed July 27, 1964  2 Sheets-Sheet 1

JOHN S. CASE
INVENTOR

BY Walter G. Finch
ATTORNEY

Aug. 30, 1966  J. S. CASE  3,268,946
GATE HINGE SUPPORT CLAMP DEVICE
Filed July 27, 1964  2 Sheets-Sheet 2

JOHN S. CASE
INVENTOR

BY *Walter G. Finch*
ATTORNEY

United States Patent Office 3,268,946
Patented August 30, 1966

3,268,946
GATE HINGE SUPPORT CLAMP DEVICE
John S. Case, Towson, Md., assignor to Anchor Post Products, Inc., Baltimore, Md., a corporation of New Jersey
Filed July 27, 1964, Ser. No. 385,399
4 Claims. (Cl. 16—158)

This invention relates generally to clamp fasteners, and more particularly it pertains to a strap-type bracket for supporting an object on a structural member, such as a post.

The use of straps for securing a bracket to a post without drilling the latter is a well-known expedient. However, the commonly used devices to accomplish this leave much to be desired in strength, appearance, and versatility.

It is an object of this invention, therefore, to provide a clamp bracket arrangement for structural members such as posts which, through camming action, has greater strength and adherence to the surface of any shaped post than heretofore.

Another object of this invention is to provide a clamp bracket which guides and tensions a strap with maximum peripheral contact to a post type structural member.

And another object of the invention is to provide a non-twisting toggle action in a strap tensioning bracket.

Another object of this invention is to provide a gate hinge pin bracket of improved construction which is simple and economical to manufacture and which is adaptable to many different structural shapes of posts.

Yet another object of this invention is to provide a multiple strap tensioning bracket attachment for supporting rods or pipes from structural members.

These and other objects and attendant advantages of this invention will become more readily understood and apparent from the following detailed specification and two sheets of accompanying drawings in which.

Figure 1:
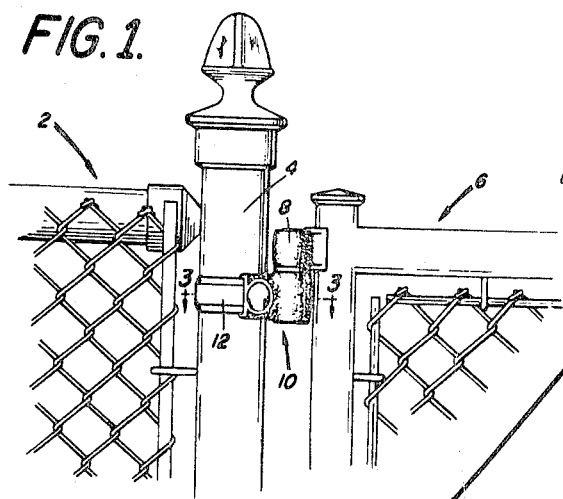
FIG. 1 is a side view of one embodiment of a gate hinge bracket incorporating features of this invention.
Figure 2:
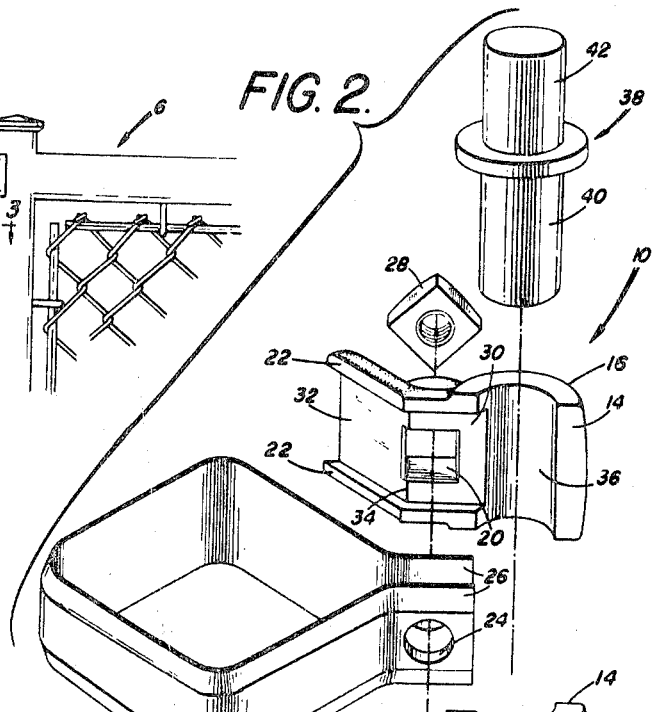
FIG. 2 is an enlarged exploded perspective depiction of the components of the gate hinge bracket of FIG. 1.

Referring now to the details of the drawings, in FIG. 1 there is shown a typical application of the novel clamp bracket assembly 10 to a hinged gate 6 in a fence 2. In this example, the bracket assembly 10 is secured to a square fence post 4 by means of a formed metal strap 12, best shown in FIGS. 2 and 3, shaped so as to closely encircle the square post 4 and terminate at one corner thereof with parallel extending ends 26.

The bracket assembly 10 includes a pair of identical cast halves 16 each having a transversely arranged apertured boss 20. At one side of the boss 20, there is formed a vertical cylindrical concavity 36 and at the other side a wing 32 which extends outwardly at an approximate forty-five degree angle. Both the inner faces of wing 32 and the boss 20 of each cast half 16 are formed to provide raised guides 22 and a recessed face 30.

The bracket assembly 10 is assembled by placing the strap 12 around the post 4 at the desired hinge location and the two cast halves 16 are fitted over the extended strap ends 26 of the strap 12. A bolt 18 is fitted through the bosses 20 by passing it through holes 24 punched in the overlapped strap ends 26. Now a hinge pin 38 having reduced diameter ends 40 and 42 is seated loosely in the opposing concavities 36 and a nut 28 is tightened on the bolt 18.

It will be noted that a vise-like toggle joint configuration exists comprising a line pivot at lips 14 of the cast halves 16, the compressive force of the bolt 18, and the jaw-like oppositely extending wings 32. In addition, the converging motion of these extending wings 32, as the nut 28 is tightened, causes a camming action against the adjacent sides of the post 4, through the strap 12. This camming action produces a vector of force on the bracket assembly 10 in a direction away from the post 4 causing the strap ends 26 to be pulled by the bolt 18, thus tightening the strap 12.

Since the pair of extending wings 32 have an included angle of 90 degrees and because of an abrupt corner 34, this strap 12 when tightened is held in maximum contact with the surface of the post 4. There is no possibility that the sides of strap 12 will take a "short cut" to the bolt 18 as in conventional strap clamps. As the bolt was tightened the line contact pivot at the lips 14 disappeared and the concavities 36 seized the lower reduced diameter 40 of the hinge pin 38. However, the toggle vise action was still effective, now moving about the axis of the pin 38.

With the hinge pin 38 thus securely held and the strap 12 tightened around the post 4, the gate 6 may be hung by its hinge eye 8 pivoting upon the upper reduced diameter 42.

Figure 4:
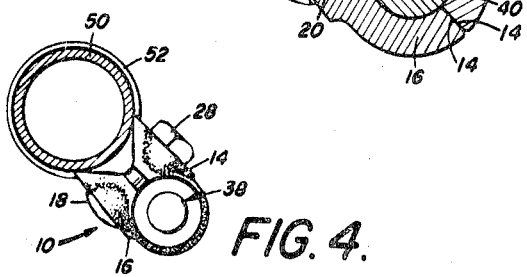
FIG. 4 is a plan view showing the gate hinge bracket as applied to a round post.

In FIG. 4, there is shown an adaption of the bracket assembly 10 to a round post or pipe 50. The fastener means may be a flexible strap 52, instead of the formed strap 12 to better conform to the curved surface of the pipe 50. It is apparent that the camming action and toggle vise grip is fully as effective as against square posts. Other shapes of posts 4 or 50 may be used, such as a structural angle, as desired for design purposes.

The size of post 4 or 50 is immaterial for square or L-angle, but the camming action, while present, is not as effective on large cylinders unless the bracket assembly 10 is also made large so the points of tangency of the extending wings 32 are widely spaced.

Where heavy loads are involved it will occur to those skilled in the art to provide a plurality of vertically spaced straps 12 and bolts 18 in a single pair of doubly winged lipped halves and a single hinge pin.

In any case, the guides 22 embracing the strap 12 tend to hold the cast halves 16 from twisting with respect to each other when the bolt 18 is tightened. This interlocking factor may be augmented by teeth (not shown) which can be cast on the lips 14 and which intermesh when the cast halves 16 are brought together.

Figure 3:
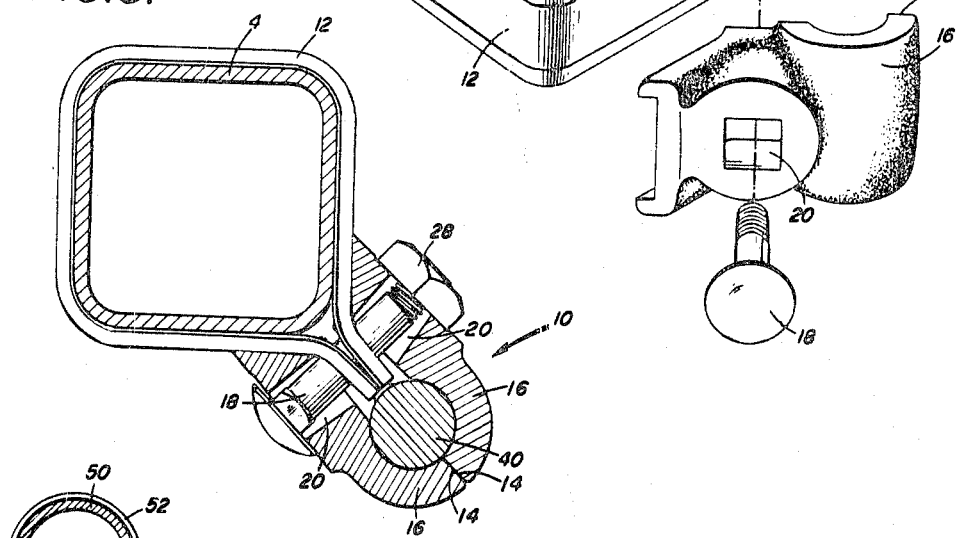
FIG. 3 is an enlarged cross-section view taken along the line 3—3 of FIG. 1.
Figure 5:
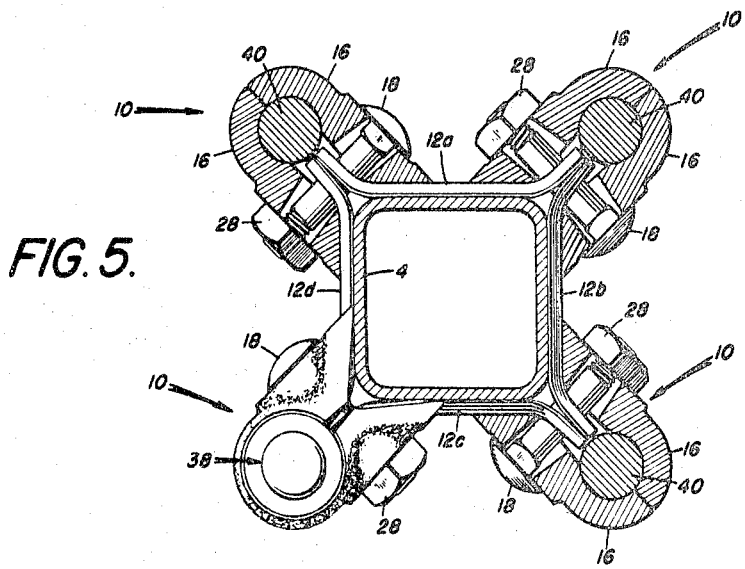
FIG. 5 is a horizontal cross section, partly in plan, of another embodiment of the gate hinge bracket for supporting a plurality of hinge pins.

In an another embodiment of the invention illustrated in FIG. 5, the strap 12 in the arrangement of FIG. 3 is split at each corner of the post 4. The resulting short straps 12a, 12b, 12c, and 12d are bolted together where they overlap with additional clamp bracket assemblies 10 for the purpose of supporting three more rod-like elements such as hinge pins 38.

Figure 6:
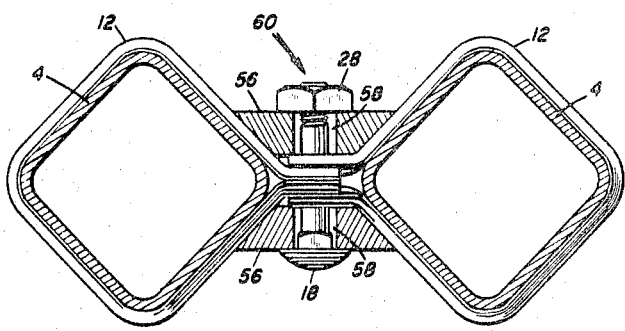
FIG. 6 is a horizontal cross section, partly in plan, of a third embodiment of a gate hinge bracket for use with spaced square cross section posts.
Figure 7:
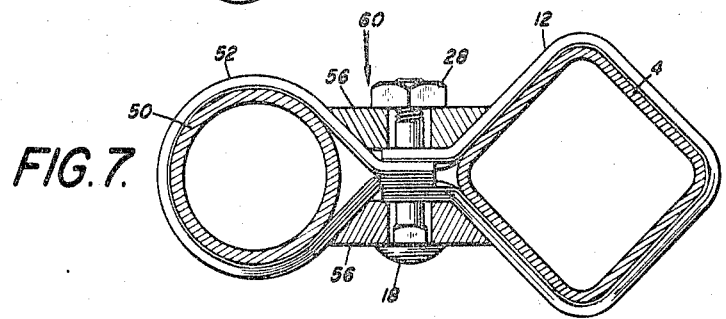
FIG. 7 is a view similar to FIG. 6 of a gate hinge bracket for use with square and circular cross section posts.
Figure 8:
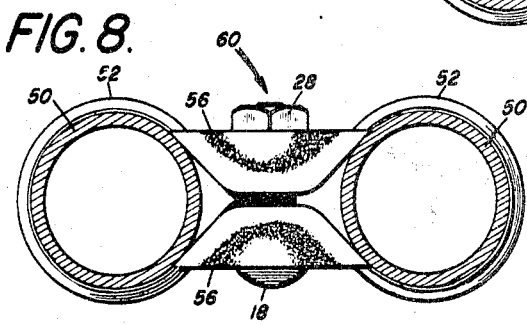
FIG. 8 is a view similar to FIG. 6 of a gate hinge bracket for use with spaced circular cross section posts.

The toggle joint action of the hinge pins 38 and lipped ends of the bracket halves 16 can be replaced by a second strap 12 around a second post 4 or 50 as shown in FIGS. 6, 7, and 8. In such circumstances a clamp bracket assembly 60 is used having a pair of bracket halves 56 which are double ended concerning the previously mentioned wings 22. Thus the right and left strap 12 and/or 52 are simultaneously drawn inwardly toward a common bolt 18 as it is tightened in a common apertured boss 58. It is important to note that the previously mentioned camming action occurs at the same time against both posts of all arrangements; FIGS. 6, 7 and 8 to make a rigid mechanical assembly.

The uses of a clamped bracket assembly as described are numerous. Flag pole or radio antenna extensions, hand rails, cable guides, and parallel pipe runs are but a few to be suggested. Demountable scaffolding, guy rod or wire braced structure, also can advantageously employ the improved strap bracket.

Obviously many modifications and variations of the present invention are possible in the light of the above teachings. It is, therefore, to be understood that within the scope of the appended claims the invention may be practiced otherwise than as specifically described.

What is claimed is:

1. A hinge bracket device for pivotally connecting a structural member to a post member having a cross-section consisting of four sides, comprising a narrow flat flexible strap member for mounting on said post member, said strap member terminating in a pair of parallel extending spaced apertured ends, a pair of substantially identical mating half members each having a transversely and horizontally extending apertured boss arranged in axial alignment, a jaw extending from one end of each boss having a vertically extending concavity therein and a wing extending outwardly and angularly from the opposite end of each boss, with the angularity between the wings of said mating half members being equal to the angle between a pair of adjacent sides of said post member, the outer end of each wing extending to a point intermediate the width of its respective side of said pair of adjacent sides of said post member, each wing and boss of each mating half member having spaced guides with a recessed surface therebetween on their respective inner faces for receiving in surface engagement therewith said strap member, the depth of each said recessed surface corresponding to the thickness of said strap member and each said recessed surface being parallel to the inner face of its respective mating half member, and means extending through said apertured bosses and apertured terminating ends of said strap member for simultaneously holding said terminating ends of said strap member between the respective recessed surfaces of said mating half members, whereby said strap member is held in surface engagement with substantially the entire width of each side of said pair of adjacent sides of said post member, with the concavities of said jaws simultaneously being drawn together to form a continuous surface for receiving a portion of said structural member.

2. The hinge bracket device as recited in claim 1, wherein the cross-section of said post member is square.

3. In a hinge bracket device for pivotally connecting a first structural member to a second structural member having a cross-section consisting of four sides, and a narrow flat flexible strap member for mounting on said second structural member, said strap member terminating in a pair of parallel extending spaced apertured ends, a pair of substantially identical mating half members each having a transversely and horizontally extending apertured boss arranged in axial alignment, a jaw extending from one end of each boss having a vertically extending concavity therein and a wing extending outwardly and angularly from the opposite end of each boss, with the angularity between the wings of said mating half members being equal to the angle between a pair of adjacent sides of said second structural member, the outer end of each wing extending to a point intermediate the width of its respective side of said pair of adjacent sides of said second structural member, each wing and boss of each mating half member having spaced guides with a recessed surface therebetween on their respective inner faces for receiving in surface engagement therewith said strap member, the depth of each said recessed surface corresponding to the thickness of said strap member and each said recessed surface being parallel to the inner face of its respective mating half member, and means extending through said apertured bosses and apertured terminating ends of said strap member for simultaneously holding said terminating ends of said strap member between the respective recessed surfaces of said mating half members, whereby said strap member is held in surface engagement with substantially the entire width of each side of said pair of adjacent sides of said second structural member, with the concavities of said jaws simultaneously being drawn together to form a continuous surface for receiving a portion of said first structural member.

4. In combination, a first structural member, a second structural member having a cross section consisting of four sides and a hinge bracket device for pivotally connecting said first structural member to said second structural member, said device consisting of a narrow flat flexible strap member substantially for mounting on said second structural member, said strap member terminating in a pair of parallel extending spaced apertured ends, a pair of substantially identical mating half members each having a transversely and horizontally extending apertured boss arranged in axial alignment, a jaw extending from one end of each boss having a vertically extending concavity therein and a wing extending outwardly and angularly from the opposite end of each boss, with the angularity between the wings of said mating half members being equal to the angle between a pair of adjacent sides of said second structural member, the outer end of each wing extending to a point intermediate the width of its respective side of said pair of adjacent sides of said second structural member, each wing and boss of each mating half member having spaced guides with a recessed surface therebetween on their respective inner faces for receiving in surface engagement therewith said strap member, the depth of each said recessed surface corresponding to the thickness of said strap member and each said recessed surface being parallel to the inner face of its respective mating half member, and means extending through said apertured bosses and apertured terminating ends of said strap member for simultaneously holding said terminating ends of said strap member between the respective recessed surfaces of said mating half members, whereby said strap member is held in surface engagement with substantially the entire width of each side of said pair of adjacent sides of said second structural member, with the concavities of said jaws simultaneously being drawn together to form a continuous surface for receiving a portion of said first structural member.

References Cited by the Examiner

UNITED STATES PATENTS

| 430,272 | 6/1890 | Darnell | 16—158 |
| 1,264,446 | 4/1918 | Sears. | |

EDWARD C. ALLEN, *Primary Examiner.*

D. L. TROUTMAN, *Assistant Examiner.*